(12) United States Patent
Luca et al.

(10) Patent No.: US 6,378,620 B1
(45) Date of Patent: Apr. 30, 2002

(54) METHOD AND APPARATUS FOR CONTROLLING THE ATTITUDE OF AN IMPLEMENT

(75) Inventors: Nicolini Luca, Modena; Gregorio Angelo, Cittanova; Eugenio Sereni, Albareto, all of (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/792,369

(22) Filed: Feb. 23, 2001

(30) Foreign Application Priority Data

Feb. 29, 2000 (IT) .......................................... BO200A101

(51) Int. Cl.$^7$ ............................................ A01B 63/111
(52) U.S. Cl. ...................................................... 172/4
(58) Field of Search ........................... 172/4, 4.5, 5, 6, 172/7, 272, 47, 439, 440–444; 180/89.12, 89.13; 296/190.07; 701/50

(56) References Cited

U.S. PATENT DOCUMENTS 4,220,350 A * 9/1980 Hatcher ....................... 280/656
4,508,178 A * 4/1985 Cowell et al. ............... 172/239
5,579,850 A * 12/1996 Kimura et al. .................. 172/4
6,029,764 A * 2/2000 Schubert .................... 180/89.13

FOREIGN PATENT DOCUMENTS

| CA | 664625 | * | 6/1963 | ..................... 172/4 |
| NO | 89848 | * | 1/1953 | ..................... 172/4 |

* cited by examiner

Primary Examiner—Robert E. Pezzuto
(74) Attorney, Agent, or Firm—Larry W. Miller; John William Stader

(57) ABSTRACT

Method and apparatus for controlling the attitude of an agricultural implement drawn by an agricultural tractor, the device including a lift; two deflection sensors located at the attachment points of the bottom arms of the lift to the frame of the agricultural tractor; and an electronic central control unit for processing data received from the sensors and controlling lifting and lowering of the implement by the lift as a function of the data detected by the two sensors; the device being characterised in that each of the sensors has a locking device for adjusting the position of each of the sensors with respect to the frame so that each of the sensors assumes a predetermined tilt with respect to the ground.

16 Claims, 3 Drawing Sheets

SEC. III-III

METHOD AND APPARATUS FOR CONTROLLING THE ATTITUDE OF AN IMPLEMENT

FIELD OF THE INVENTION

The present invention relates generally to a method and apparatus for controlling the attitude of an implement drawn by an agricultural tractor, and more specifically to improved method and apparatus for such purpose that do not rely on measurement of the working resistances of the implement.

BACKGROUND OF THE INVENTION

Many agricultural tractors are equipped with devices for automatically controlling the attitude of the implement by detecting the force exerted on the lift attachment arms, so as to optimise tractor performance by lifting the implement as a function of its working resistance. In particular, devices applied to a hydraulic lift are known in which ground action on the implement is determined by two sensors fitted to two pins about which the bottom lift arms pivot with respect to the tractor frame; and the implement is lifted by two top arms pivoting with respect to the frame, powered by a hydraulic system, and also connected mechanically to the bottom arms. In other words, the two top arms and respective bottom arms and connecting rods together define the lift. The sensors on the bottom arm pins provide for measuring deflection of the pins under the load exerted by the implement. Such a device is described, for example, in European patent application no. 95203063.3 (in the name of New Holland Italia S.p.A.) in which the agricultural tractor described employs two Hall-effect deflection sensors located at the attachment points of the lift arms to the frame.

The neutral plane of the sensors remains substantially perpendicular at all times to the ground being worked, so that the apparatus shown in the European application identified above, and similar apparatus, do not allow for the deflection sensor being rotated a given angle with respect to the ground. For this reason, since the deflection sensor detects stress substantially perpendicular to the neutral plane, the arrangement shown in the above-identified European application only provides for measuring the pulling force of the implement, which results in poor measurement and control when the pulling force is affected by the configuration as opposed to the working depth of the implement.

With an implement such as a ripper, in which the pulling force is mainly exerted by the ends, and which provides for producing drainage holes of more or less constant depth, on encountering ground areas of different consistency, pull-controlled lifting is only effective in the presence of considerable undesired variations in working depth. Lifting also produces an increase in vertical load due to the geometry of the ends, which results in increased lift pressure in the hydraulic circuit and in a chain reaction which may even result in the implement being withdrawn completely from the ground. At which point, the system commands a rapid downstroke, thus resulting in jerky operation with the implement being continually withdrawn and lowered rapidly.

SUMMARY OF THE INVENTION

Accordingly, it is an object of the present invention to provide novel and improved method and apparatus for controlling the attitude of an implement drawn by an agricultural tractor, and which enables the operator to selectively adjust the tilt of the deflection sensors with respect to the ground plane. More particularly, these novel method and apparatus provide for tilting the neutral plane of the sensor with respect to the substantially horizontal ground plane for different working conditions of the implement and different ground consistencies and properties.

Another object of the invention is to provide method and apparatus wherein the deflection sensor detects not only the pulling force of the implement but also a sustaining and lifting force component indicating, instant by instant, the way in which the pulling force is actually affected by the lifting force. The lifting force produces a component on the read axis of the sensor but oppositely oriented with respect to the pulling force projection, so that the electronic central control unit receives a lower reading which slows down, and eventually arrests, the lift operation in proportion to the ground penetration force of the implement. The lift operation can therefore be arrested long before the implement is withdrawn completely from the ground, thus eliminating any jerkiness and enabling smooth operation more in keeping with conditions external to the automatic implement lift system.

These and other objects, features and advantages are accomplished according to the instant invention by providing method and apparatus for controlling the attitude of an implement drawn by an agricultural tractor, the device comprising a lift; two deflection sensors located at the attachment points of the bottom arms of the lift to the frame of the agricultural tractor; and an electronic central control unit for processing data received from the sensors and controlling lifting and lowering of the implement by the lift as a function of the data detected by the two sensors. The device is further characterised in that each of the sensors comprises locking means for adjusting the position of the sensor with respect to the frame so that the sensor assumes a predetermined tilt with respect to the ground.

DESCRIPTION OF THE PREFERRED EMBODIMENT

Figure 1:
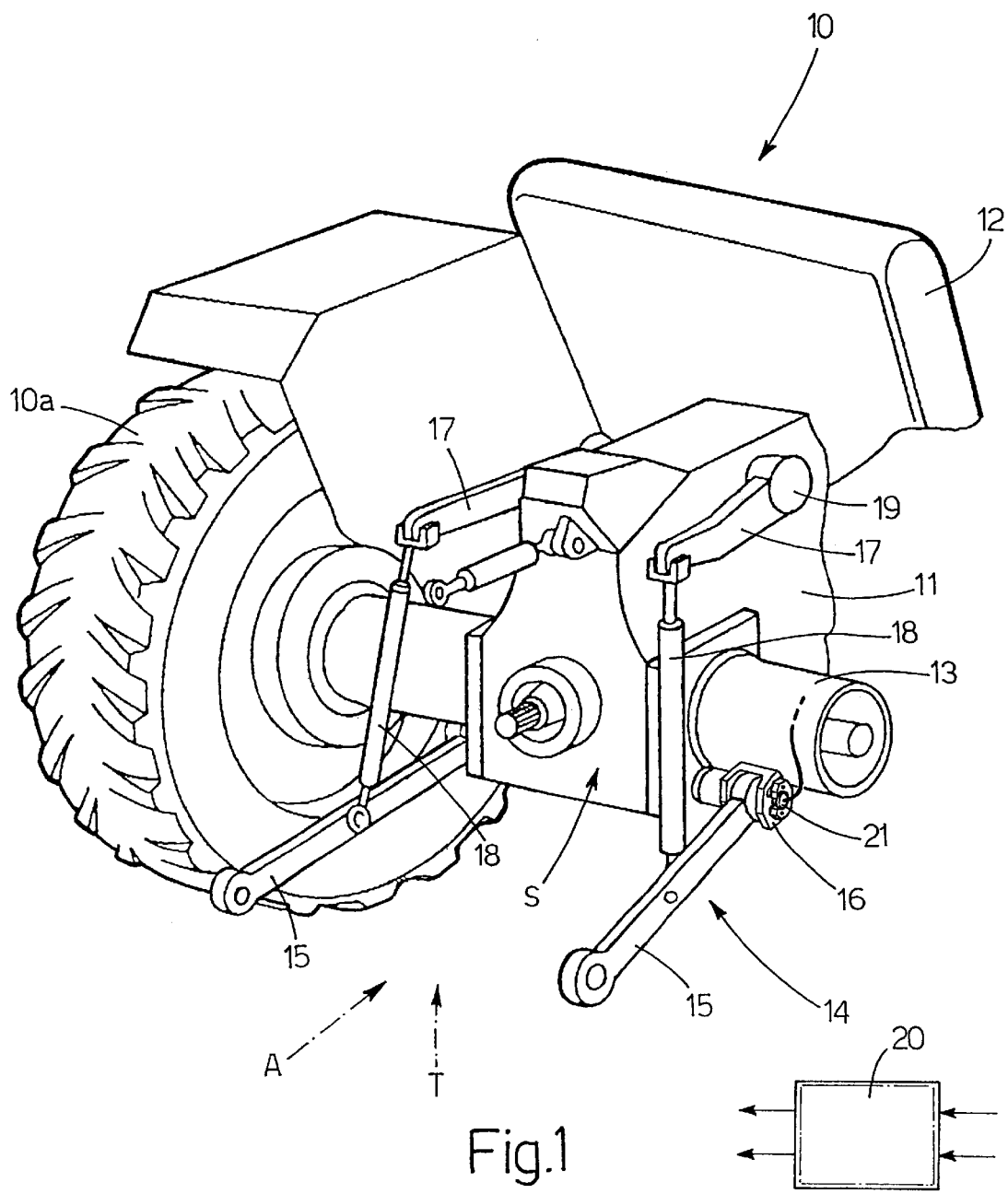
FIG. 1 is a perspective view of the rear of an agricultural tractor equipped with a device in accordance with the instant invention.

Referring now to FIG. 1, reference number 10 indicates the rear of an agricultural tractor comprising a frame 11 for supporting a seat 12 and a rear axle 13 fitted in known manner with two rear wheels 10a (only one shown). Frame 11 is fitted mechanically with a device 14 for controlling the attitude of an agricultural implement A (not shown in FIG. 1), and which is the main object of the present invention.

Device 14 comprises two bottom arms 15, by which respective members 16 (only one shown in FIG. 1) projecting from frame 11 (see also FIGS. 2 and 3) are connected mechanically to the agricultural implement A drawn by agricultural tractor 10. Device 14 also comprises two top arms 17 corresponding with and connected to bottom arms 15 by respective articulated rods 18, i.e., as shown in FIG.

1, each bottom arm 15 is connected mechanically to the corresponding top arm 17 by a corresponding rod 18 pivoting with respect to arms 15 and 17.

One end of each top arm 17 is integral with a shaft 19, which is rotated in known manner (not shown) by an electronic central control unit 20 for processing a number of signals from two deflection sensors 21 fitted to members 16 projecting from frame 11.

Bottom arms 15, top arms 17, rods 18, and shaft 19 together form part of a lift S powered, for example, by a hydraulic circuit (not shown) and for lifting and lowering with respect to ground T any implement A attached by known mechanical means to bottom arms 15. Lifting and lowering of implement A with respect to ground T may obviously be controlled by electronic central control unit 20, which may activate a hydraulic system (not shown) to rotate shaft 19 one way or the other.

Figure 3:
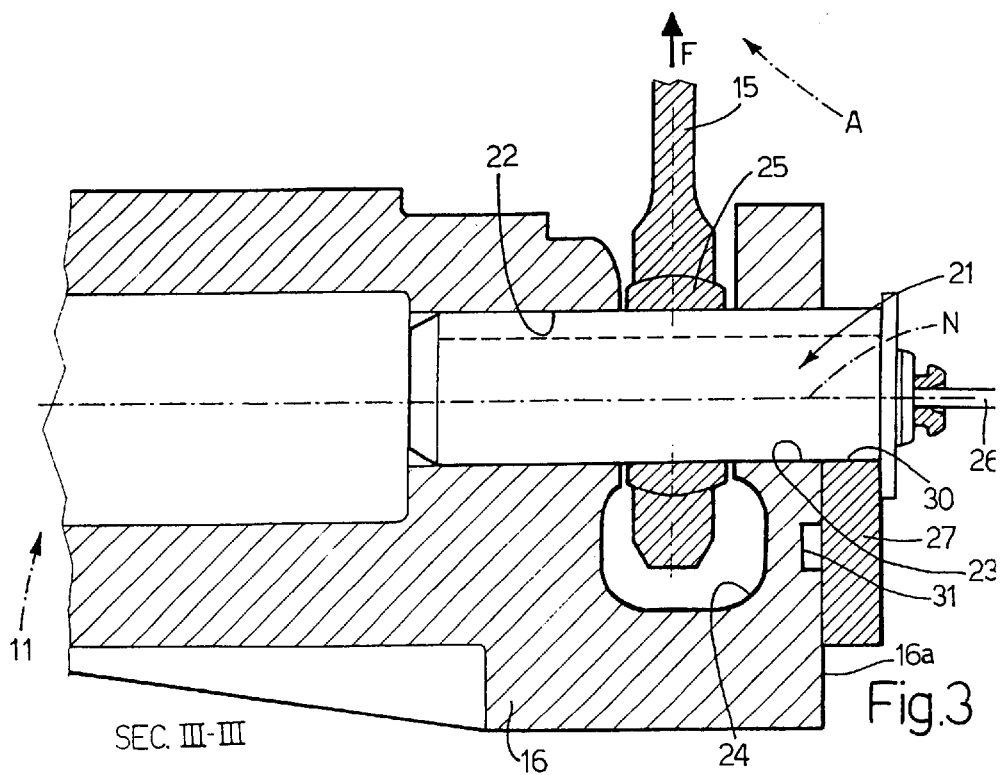
FIG. 3 is a cross-sectional view, taken along lines III—III of FIG. 2.

As shown in FIG. 3, each sensor 21 is inserted inside two coaxial through holes 22 and 23, between which cavity 24 houses a spherical joint 25 interposed between sensor 21 and the corresponding bottom arm 15.

When pull F (FIG. 3) is exerted by implement A, sensor 21 deflects by an amount depending on the value of force F. That is, the greater the pull F exerted by implement A via arm 15, the greater the deflection of corresponding sensor 21; and the amount of deflection is convertible into an electrical signal transmitted over a cable 26 to central control unit 20 which, as stated, controls lift S.

Consequently, when an anomalous increase in force F occurs during the working of ground T by implement A, central control unit 20 raises implement A from ground T in known manner, and, once the cause of the anomalous increase in F is removed, lowers implement A back down to ground T.

Figure 2:
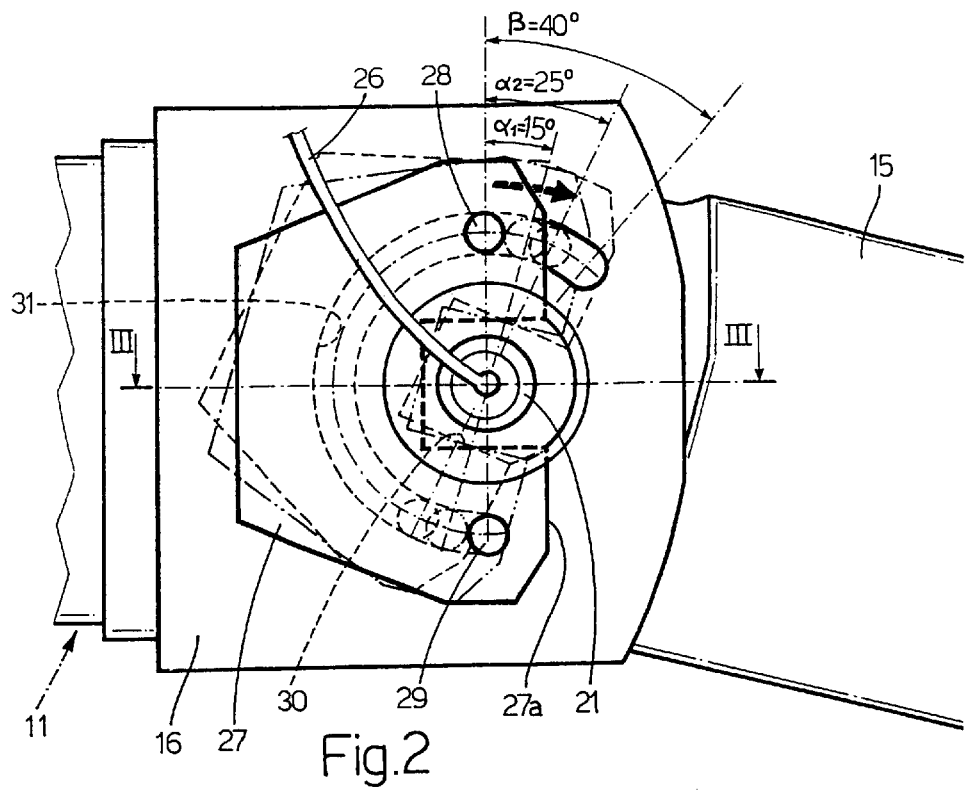
FIG. 2 is a side elevational view of the of the sensor arrangement of the instant invention.
Figure 4:
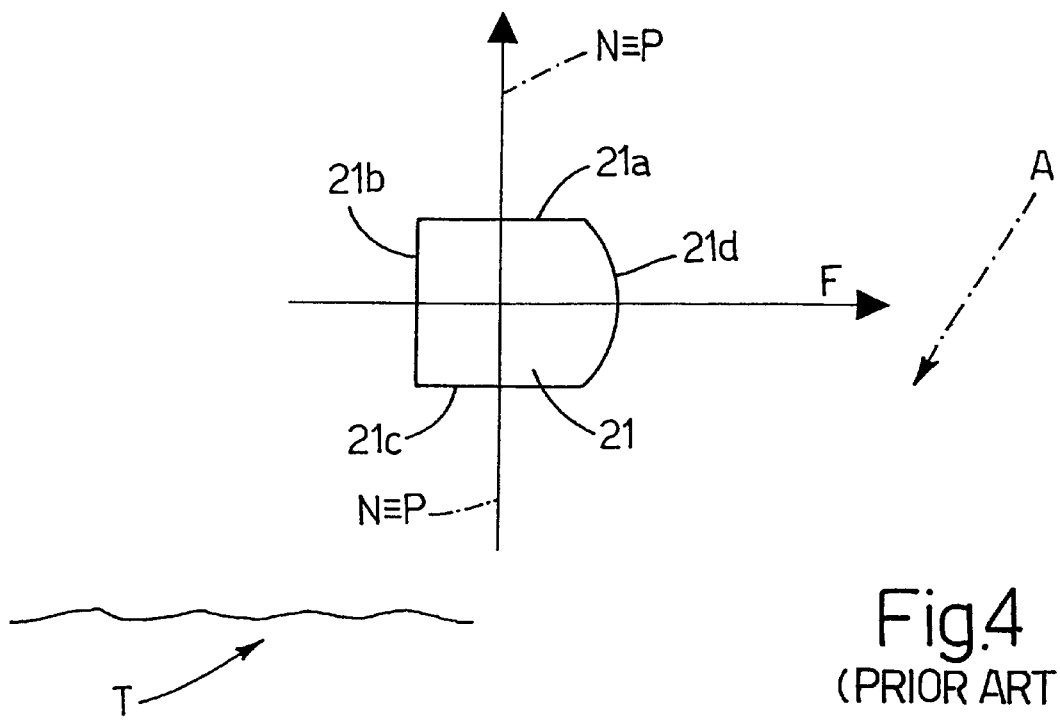
FIG. 4 is a dynamic diagram relative to a deflection sensor in the prior-art position with respect to the frame.
Figure 5:
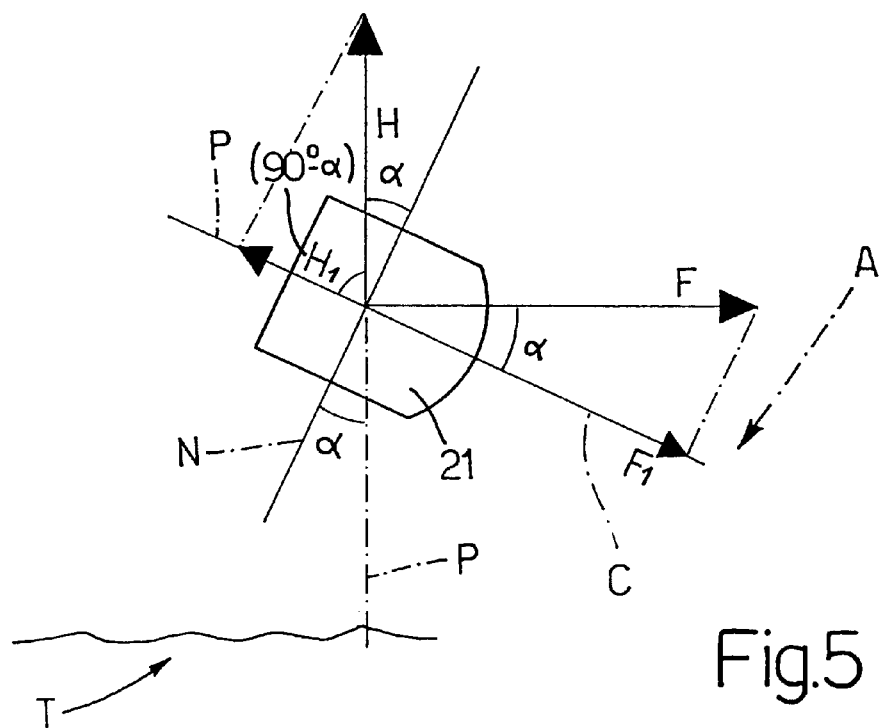
FIG. 5 is a dynamic diagram relative to a sensor positionable with respect to the frame according to the present invention.

As shown in FIGS. 2, 4, and 5, the cross section of sensor 21 comprises three straight sides 21a–21c perpendicular to one another, and a curved side 21d connecting straight sides 21a and 21c. The cross section of sensor 21 is so shaped to enable sensor 21 to be positioned correctly with respect to a locating plate 27 (FIGS. 2 and 3) which may be fixed by two bolts 28, 29 to member 16 integral with frame 11. More specifically, curved face 21d of sensor 21 must be positioned facing implement A, so that, in the prior-art embodiment shown in FIG. 4, the neutral axis N of sensor 21 is substantially perpendicular to the surface of ground T.

It should be pointed out that neutral axis N is the line left in the drawing plane by the neutral plane N of the deflected beam defined by sensor 21 C, (see also FIG. 3). If the neutral plane N is not positioned correctly, the F values detected by sensor 21 are unreliable and result in malfunctioning of the system as a whole.

To position sensor 21 correctly with respect to locating plate 27, a foolproof seat 30 need simply be formed in known manner in the face 27a of plate 27 facing implement A. Seat 30 has three flat perpendicular faces to house sides 21a–21c of sensor 21, so that curved face 21d of sensor 21 is positioned correctly facing implement A.

FIG. 4 shows a conventional position of sensor 21, in which neutral axis N is coincident with the axis P perpendicular to ground T, and, as stated, axis N is perpendicular to the force F exerted by implement A on one of bottom arms 15. H indicates the force produced by rod 18 to lift implement A off the ground upon force F exceeding a predetermined threshold. As can be seen, in this case, force H is not detected by sensor 21 by lying along neutral axis N and therefore being unable to exert either tensile or compressive stress on the fibers of sensor 21 on either side of neutral plane N.

On the other hand, if, as shown in FIG. 5, sensor 21 is tilted a given angle $\alpha$ as explained in detail below, sensor 21 is able to detect not only component F1 of F along an axis C perpendicular to neutral axis N, but also component H1 of force H along the same axis C. F1 will obviously be equal in absolute value to (F cos $\alpha$), and H1 equal in absolute value to (H sin $\alpha$).

From a different point of view, angle $\alpha$ may be considered the angle formed by neutral axis N and axis P perpendicular to ground T. Obviously, in the prior-art situation shown in FIG. 4, angle $\alpha=0°$.

In the FIG. 5 case, central control unit 20 is able to determine force F1 perpendicular to neutral axis N, which is actually less than F. By means of appropriate processing by central control unit 20, however, it is possible to correct this false reading to work out the real value of F from the detected F1 value.

Only being able to read a force lying along axis C, sensor 21 determines the value R of the vector sum of F1 and H1. In other words, sensor 21 can also "see" the force H, in the form of H1, produced by arms 17 via rods 18, and can therefore read the instantaneous value of R=(F1−H1).

Consequently, when rod 18 lifts bottom arm 15, and hence H is other than zero, not only is the resultant force R reduced on account of the increase in H1, but there is also a simultaneous reduction in force F1 by implement A being raised by arms 15. Arms 15 stop lifting as soon as value R falls within a predetermined acceptance range. If force R increases again, central control unit 20 commands rods 18 to produce new forces H to lift implement A, and so on.

Off-ground lifting of implement A is thus broken up into several parts to prevent implement A from being withdrawn completely from ground T to no purpose. In other words, in the presence of an exceptional force F1, and hence F, lift S begins lifting bottom arms 15 by just enough to restore the values of R to a predetermined acceptance range, so that in many cases implement A is allowed to continue working ground T as opposed to being withdrawn completely by lift S.

By correctly coordinating forces H and F, the present invention therefore provides for preventing jerky operation caused by implement A being withdrawn completely from ground T, being plunged straight back into ground T upon central control unit 20 determining a zero force F, and then being withdrawn completely once more upon force F again exceeding the threshold value. For example, when working fairly soft ground T beneath a very hard layer, as in the case of grassland, using sensor 21 tilted at a given angle $\alpha$ (FIG. 5), central control unit 20 stops implement A from being lifted once R falls once more within an acceptable range. Using a conventionally positioned sensor 21 (FIG. 4), on the other hand, once the hard outer layer is detected, implement A is withdrawn completely, thus giving rise to undesired jerking. As stated, positioning sensor 21 with respect to frame 11 according to the present invention prevents implement A from being withdrawn completely to no purpose, thus keeping the implement longer in the work position.

Tilt $\alpha$ depends on the desired sensitivity of the system. More specifically, the further sensor 21 is tilted, i.e. the greater angle $\alpha$, the greater the value of H1 and hence system sensitivity with respect to H.

Tilt $\alpha$ is also user selected on the basis of mean penetration of implement A, the type of ground, and desired system sensitivity. The system may therefore be sold, for example, together with maker's tables indicating recommended tilt angles $\alpha$ for different ground consistencies and implements;

and the system may be in-field calibrated by the user on a trial and error basis using values in the region of the α angles recommended by the maker.

If implement A is a ripper, for example, ground penetration is deep, so that lift action is preferably broken up considerably, and a tilt angle α ranging between 20° and 25° preferably selected to obtain substantial H1 components and increase lift action break-up.

Conversely, in the case of soft ground and an implement A in the form of a disk harrow or cultivator, tilt angles α of close to zero and nearing the FIG. 4 (prior-art) position may be used. In this case, in fact, a high degree of break-up is not required.

Tests have shown that angles α ranging between 0° and 40° cover a wide range of agricultural implements A and different types of ground.

Sensor 21 can be tilted using the system shown in FIG. 2. A substantially C-shaped groove 31 is formed in the outer face 16a (FIG. 3) of member 16, so that by means of bolts 28 and 29, plate 27 can be fitted in a position other than that shown by the continuous line in FIG. 2. For example, plate 27 can be fitted in a first position defined by a tilt angle α1 of 15°, or in a second position defined by a tilt angle α2 of 25°; α1 and α2 both being within an angle β of 40° for the reason explained above. In the FIG. 2 embodiment, groove 31 is therefore in the form of a 130° sector (90°+40°).

To adjust the system to the conditions of a new implement A or different ground T, or both, the user simply unscrews bolts 28 and 29 from groove 31, rotates plate 27, e.g. clockwise, to set the approximate tilt angle α recommended, for example, in a table supplied by the maker of agricultural tractor 10, and then fixes plate 27 back on to member 16. The user then proceeds by trial and error to determine the best tilt angle α for the implement A and ground T involved.

To anyone skilled in the art, the above-described system with particular reference to FIG. 2 may obviously be replaced with a similar mechanical system for rotating plate 27 by the desired angle α without, however, departing from the scope of the present invention. For example, in a further embodiment not shown, plate 27 is rotated by a lever connected to plate 27 itself. Plate 27 may also be rotated by remote-control systems, in particular, operated by the user from seat 12.

Having thus described the invention, what is claimed is:

1. Apparatus for controlling the attitude of a ground-engaging agricultural implement drawn along the ground by an agricultural tractor, the tractor having a frame, an engine and an operator's platform, said apparatus comprising:
    a lift for attachment to said implement, said lift including two spaced apart and generally parallel bottom arms pivotably attached to said tractor frame;
    a deflection sensor located at the attachment points to said frame of each said bottom arm of said lift, each said sensor having a neutral axis;
    an electronic central control unit for processing signals received from said sensors and controlling lifting and lowering of said implement by said lift as a function of the signals detected by said sensors; and
    separate locking means holding each said sensor for adjusting the position of each said sensor with respect to said frame so that said neutral axis of said sensors assumes a predetermined angle with respect to an axis substantially perpendicular to the ground.

2. The apparatus of claim 1, wherein said angle ranges between 0° and 40°.

3. The apparatus of claim 2, wherein each said locking means includes a semi-circular groove coaxial with respect to said neutral axis and fitted 130° around each said sensor and at least one bolt fitted in said groove to lock said sensor in position.

4. The apparatus of claim 3, wherein said locking means are remote-controllable.

5. The apparatus of claim 4, wherein said sensor detects a first vector component, said first vector component being the vector component of the lifting force of said lift that is perpendicular to said neutral axis.

6. The apparatus of claim 5, wherein each said sensor detects the vector sum of said first vector component and a second vector component, said second vector component being the component of the pulling force of said implement that is perpendicular to said neutral axis.

7. The apparatus of claim 6, wherein said electronic central control unit, depending on the value detected instant by instant of said vector sum, activates or not said lift to lift or lower said agricultural implement with respect to the ground.

8. The apparatus of claim 7, wherein said angle of each said sensor with respect to the ground is determined as a function of the implement and the type of ground to be worked.

9. A method of controlling the attitude of an agricultural implement drawn by an agricultural tractor; the method comprising the steps of:
    (a) determining a vector sum (R) of a component (H1) of a lifting force (H) of a lift and a component (F1) of the pulling force (F) of said implement; said components (H1, F1) being considered along an axis (C) perpendicular to the neutral axis of a deflection sensor;
    (b) lifting said agricultural implement upon said vector sum (R) exceeding a predetermined threshold value;
    (c) arresting the lifting of said agricultural implement upon said vector sum (R) falling within a predetermined acceptance range; and
    (d) lowering the agricultural implement back to the ground.

10. The method of claim 9, wherein all the operations are controlled by an electronic central control unit.

11. In an apparatus for controlling the attitude of a ground-engaging agricultural implement drawn along the ground by an agricultural tractor, said tractor having a frame, said apparatus including
    a lift mechanism for attachment to said implement, said lift including two spaced apart and generally parallel bottom arms each attached at a pivot point to said tractor frame for pivotal movement in a vertical plane generally perpendicular to the ground;
    a deflection sensor located at the pivot points to said frame of each said bottom arm of said lift, each said sensor having a neutral axis;
    an electronic central control unit for processing signals received from said sensors and controlling lifting and lowering of said implement by said lift as a function of the signals detected by said sensors, the improvement comprising:
    separate locking means holding each said sensor for adjusting the position of each said sensor with respect to said frame so that the angle between said neutral axis of said sensors and an axis substantially perpendicular to the ground may be changed to change the signals received by said electronic central control unit from said sensors.

12. The improvement of claim 11, wherein said angle may vary between 0° and 40°.

13. The apparatus of claim 12, wherein said sensor detects a first vector component, said first vector component being the vector component of the lifting force of said lift that is perpendicular to said neutral axis.

14. The apparatus of claim 13, wherein each said sensor detects the vector sum of said first vector component and a second vector component, said second vector component being the component of the pulling force of said implement that is perpendicular to said neutral axis.

15. The apparatus of claim 14, wherein said electronic central control unit, depending on the value detected instant by instant of said vector sum, activates or not said lift to lift or lower said agricultural implement with respect to the ground.

16. The apparatus of claim 15, wherein said angle of each said sensor with respect to the ground is determined as a function of the implement and the type of ground to be worked.

* * * * *